US012098315B2

(12) United States Patent
Lüchinger et al.

(10) Patent No.: US 12,098,315 B2
(45) Date of Patent: Sep. 24, 2024

(54) LUMINESCENT CRYSTALS WITH SHELLS

(71) Applicant: Avantama AG, Stäfa (CH)

(72) Inventors: Norman Albert Lüchinger, Stäfa (CH); Marek Oszajca, Stäfa (CH); Maksym Kovalenko, Zürich (CH); Dominic Guggisberg, Zürich (CH); Dmitry Dirin, Zürich (CH)

(73) Assignee: Avantama AG, Stäfa (CH)

( * ) Notice: Subject to any disclaimer, the term of this patent is extended or adjusted under 35 U.S.C. 154(b) by 0 days.

(21) Appl. No.: 18/273,811

(22) PCT Filed: Sep. 1, 2022

(86) PCT No.: PCT/EP2022/074350
§ 371 (c)(1),
(2) Date: Jul. 24, 2023

(87) PCT Pub. No.: WO2023/036687
PCT Pub. Date: Mar. 16, 2023

(65) Prior Publication Data
US 2024/0093088 A1    Mar. 21, 2024

(30) Foreign Application Priority Data
Sep. 10, 2021 (EP) .................... 21195939

(51) Int. Cl.
*C09K 11/66* (2006.01)
*C09K 11/02* (2006.01)
(52) U.S. Cl.
CPC ........... *C09K 11/664* (2013.01); *C09K 11/02* (2013.01); *C01P 2004/64* (2013.01); *C01P 2004/80* (2013.01)
(58) Field of Classification Search
CPC ... C09K 11/664; C09K 11/02; C01P 2004/64; C01P 2004/80
See application file for complete search history.

(56) References Cited

U.S. PATENT DOCUMENTS

2019/0148602 A1   5/2019  Mu et al.
2019/0348575 A1   11/2019 Lai

FOREIGN PATENT DOCUMENTS

WO   WO-2020193751 A1 * 10/2020 .......... B01J 13/0047

OTHER PUBLICATIONS

Loiudice, el al. 'Universal Oxide Shell Growth Enables in Situ Structural Studies of Perovskite Nanocrystals during the Anion Exchange Reaction.' Journal of the American Chemical Society, 2019, 141 (20). 8254-8263, May 2, 2019.*
International Search Report and Written Opinion for corresponding Application No. PCT/EP2022/074350, issued on Nov. 29, 2022.
Loiudice, et al. "Universal Oxide Shell Growth Enables in Situ Structural Studies of Perovskite Nanocrystals during the Anion Exchange Reaction." Journal of the American Chemical Society 2019 141 (20), 8254-8263 DOI: 10.1021/acs.9b02061.
International Preliminary Report on Patentability for corresponding Application No. PCT/EP2022/074350, issued on Jun. 20, 2023.

* cited by examiner

*Primary Examiner* — C Melissa Koslow
(74) *Attorney, Agent, or Firm* — Renner, Otto, Boisselle & Sklar, LLP

(57) ABSTRACT

The present invention relates to the field of luminescent crystals (LCs) of the core-shell type, components and devices comprising the same. Particularly, the present invention relates to the manufacturing of luminescent core-shell nanocrystals, wherein said nanocrystal core comprises or consists of a perovskite crystal having a size of 3-100 nm, and said nanocrystal shell comprises a metal oxide having a thickness of 0.5-10 nm and wherein said method comprises combining suitable starting materials under oxygen-free conditions. The invention further provides for specific luminescent core-shell nanocrystals, to components and products containing such luminescent core-shell nanocrystals.

17 Claims, 1 Drawing Sheet

LUMINESCENT CRYSTALS WITH SHELLS

This application is a national phase of International Application No. PCT/EP2022/074350 filed Sep. 1, 2022, which claims priority to European Patent Application No. 21195939.0 filed Sep. 10, 2021, each of which is hereby incorporated herein by reference in its entirety.

TECHNICAL FIELD

The present invention relates to the field of luminescent crystals (LCs) of the core-shell type, components and devices comprising the same.

Particularly, the present invention relates to the manufacturing of luminescent crystals with oxidic shells, wherein said method comprises combining suitable starting materials under oxygen-free conditions. The invention further provides for specific core-shell LCs with improved stability, to components and to products containing such improved core-shell LCs.

BACKGROUND ART

Luminescent crystals are of key importance in many areas of technology, such as optoelectronic applications including photovoltaics and lighting devices. It is well known that luminescent crystals are sensitive materials. There is an ever existing need for stabilizing them, particularly without compromising on optoelectronic properties, to thereby facilitate manufacturing of optoelectronic devices and to ensure long-time performance of optoelectronic devices.

Loiudice et al (JACS 2019, 141, 8254-8263) disclose a synthetic method to grow an alumina shell with tunable thickness around nanocrystal cores of perovskite crystals. The method disclosed follows the strategy of colloidal atomic layer deposition (c-ALD). In this strategy, layer-by-layer of aluminium are deposited on the surface of the perovskite and subsequently oxidized. This allows tunable thickness, but requires multiple cycles, each cycle comprising the step of Al-deposition followed by an oxidation step. It is apparent that c-ALD is suitable for laboratory-scale synthesis but fails for commercial production. Further, as acknowledged by the authors, layer thickness of only up to 6 nm is obtained (after 17 cycles), and the thus obtained shells are non-uniform (as observed by TEM analysis).

Lai et al (US2019/0348575) discloses quantum dot materials coated with silicon oxide material and methods for manufacturing such materials. The manufacturing according to Lai et al requires the presence of a cross-linking agent which is consequently incorporated in the quantum dot materials described in that document. As a result of this synthesis, and shown in FIGS. 2 and 3, multiple Quantum-dots incorporated in one sphere which contains silica and binder. Such materials, or aggregates, are not considered core-shell particles.

Mu et al (US2019/0148602) stabilized luminescent nanoparticles comprising a perovskite semiconductor and methods for manufacturing such materials. The manufacturing according to Mu requires the presence of a reactive ligand, the remnants thereof being present in the thus obtained luminescent nanoparticles.

DISCLOSURE OF THE INVENTION

In consequence, there is a need for improved methods to obtain core-shell nanocrystals and for improved core-shell nanocrystals that mitigate one or more of the known shortcomings.

These objectives are achieved by a method and nanocrystals as defined in the claims. Further aspects of the invention are disclosed in the specification and independent claims, preferred embodiments are disclosed in the specification and the dependent claims. In more general terms, the invention provides in a first aspect a method for manufacturing core-shell nanocrystals;

in a second aspect an assembly of core-shell nanocrystals;

in a third aspect a method for manufacturing an ink comprising core-shell nanocrystals in a diluent;

in a forth aspect an ink comprising core-shell nanocrystals in a diluent;

in a fifth aspect a method for manufacturing a polymer film comprising core-shell nanocrystals distributed in a polymer; and in a sixth aspect a polymer film, either free standing or on a substrate, comprising core-shell nanocrystals distributed in a polymer.

The present invention will be described in more detail below. It is understood that the various embodiments, preferences and ranges as provided/disclosed in this specification may be combined at will. Further, depending of the specific embodiment, selected definitions, embodiments or ranges may not apply.

Unless otherwise stated, the following definitions shall apply in this specification:

As used herein, the term "a", "an", "the" and similar terms used in the context of the present invention (especially in the context of the claims) are to be construed to cover both the singular and plural unless otherwise indicated herein or clearly contradicted by the context.

As used herein, the terms "including", "containing" and "comprising" are used herein in their open, non-limiting sense.

The present invention will be better understood by reference to the figures.

Figure 1:
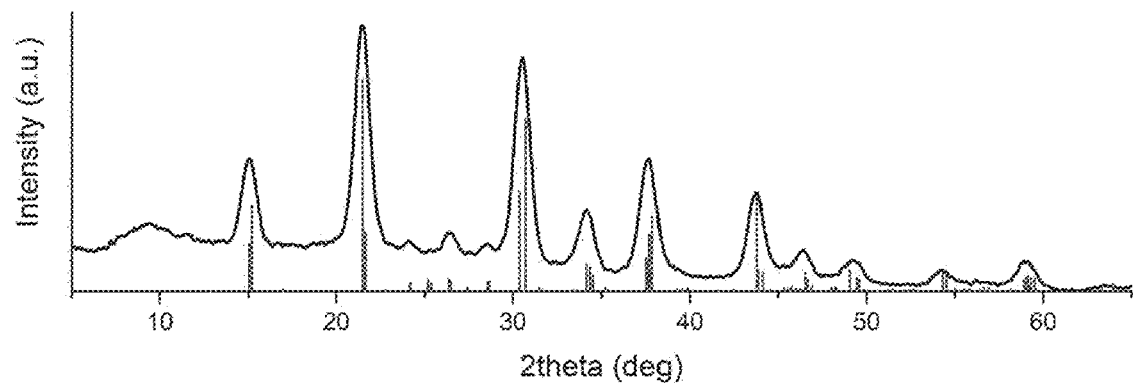
FIG. 1 shows XRD diffraction pattern of the $CsPbBr_3$ NC material after $AlO_x$ shell deposition obtained according to the example 1.2 Y-axis intensity (a.u.), X-axis 2 theta (deg)

In more general terms, in a first aspect, the invention relates to a method for manufacturing core-shell nanocrystals wherein the nanocrystals are as defined herein and wherein said method comprises the steps of (a) providing a dispersion of perovskite crystals in a non-polar solvent and a solution comprising a metal halide and a metal alkoxide in a non-polar solvent, (b) combining said dispersion and said solution, preferably under oxygen-free conditions, and optionally (c) separating the thus obtained nanocrystals from the solvent.

This method provides a uniform assembly of nanocrystals comprising a crystalline core of the perovskite structure and a metal oxide shell which is dense and fully covers said core. The method disclosed herein is beneficial as it allows a simple and reliable manufacturing of highly luminescent nanocrystals that are stable towards conditions or substances that might degrade the nanocrystals and cause a degradation in the luminescent properties. For example, the nanocrystals obtained are stable towards polar solvents and other liquids (e.g. $H_2O$) or gases ($O_2$, $H_2O$). This aspect of the invention shall be explained in further detail below:

Nanocrystal core: Main characteristics of the core are its size and its crystal structure.

Suitably, the nanocrystal core comprises or consists of a perovskite crystal. Perovskite crystals are known and may be selected from compounds of formula (I):

$$[M^1;A^1]_a M^2_b X_c \quad (I),$$

wherein
A¹ represents zero or one or more organic cations, preferably selected from the group consisting of formamidinium, ammonium, guanidinium, protonated thiourea, imidazolium, pyridinium, pyrrolidinium;
M¹ represents zero or one or more alkali metals, preferably selected from Cs, Rb, K, Na, Li;
M² represents one or more metals other than M¹, preferably selected from the group consisting of Ge, Sn, Pb, Sb, and Bi;
X represents one or more anions selected from the group consisting of halides and pseudohalides and sulfide, preferably: chloride, bromide, iodide, cyanide, thiocyanate, isothiocyanate and sulfide, particularly preferably one or more halides selected from the group consisting of Cl, Br, and I;
a represents 1-4, preferably 1;
b represents 1-2, preferably 1;
c represents 3-9, preferably 3; and
wherein either M¹ or A¹ or M¹ and A¹ being present.

Suitably, the core crystal has a size of 3-100 nm, preferably 5-15 nm. The crystals are preferably isometric, such as cubic crystals.

In embodiments, the perovskite crystal is an inorganic perovskite crystal of formula (I')

$$[M^1]_a M^2_b X_c \quad (I'),$$

wherein the substituents are as defined above. Specific examples include CsPbX₃, where X is Cl, Br, I, a mixture of Cl and Br, a mixture of Br and I.

In embodiments, the perovskite crystal is an organic perovskite crystal of formula (I'')

$$[A1]_a M^2_b X_c \quad (I''),$$

wherein the substituents are as defined above. Specific examples include FAPbX₃, where X is Cl, Br, I, a mixture of Cl and Br, a mixture of Br and I and MAPbX₃ where X is Cl, Br, I, a mixture of Cl and Br, a mixture of Br and I, where FA is formamidinium and MA is methylammonium.

Nanocrystal shell: In line with the present invention, the nanocrystal shell comprises one or more metal oxides. Main characteristics of the shell are the shell thickness, the type of metal oxide, and the shell morphology.

The thickness of the shell may vary, depending on the type of metal oxide, the nanocrystal core and the intended use. It was found that a monolayer of metal oxide already provides sufficient stability. It was further found that the shell thickness does not need to exceed the core diameter. As a consequence, suitable shell thickness ranges from a metal oxide monolayer up to core diameter. Suitable are, for example 0.5-10 nm, preferably 0.8-7 nm.

The metal oxide may be selected from a broad range of oxides ("pure metal oxides") and combinations of oxides ("mixed metal oxides"). Suitably, said pure metal oxide is selected from
AlO$_x$, with 1.4≤x≤1.6; or
SiO$_x$, with 1.9≤x≤2.1; or
TiO$_x$, with 1.9≤x≤2.1; or
ZrO$_x$, with 1.9≤x≤2.1;

Suitably, said mixed metal oxide is selected from a combination of at least two of
AlO$_x$, with 1.4≤x≤1.6;
SiO$_x$, with 1.9≤x≤2.1;
TiO$_x$, with 1.9≤x≤2.1; and
ZrO$_x$, with 1.9≤x≤2.1.

Pure or mixed oxides are available by using the respective starting materials in the solution used in step (a), i.e. the metal halide(s) and the metal alkoxide(s). Preferred are pure metal oxides, such as aluminium oxide. The terms "pure" and "mixed" relate to the presence of one or more metals, i.e. M¹O$_x$ and optionally M²O$_x$, with M preferably selected from Al, Si, Ti, and Zr.

The chemical purity of the metal oxide may vary and includes chemically pure metal oxides and metal oxides containing impurities, such as the corresponding hydroxides (M¹O$_x$·(OH)$_y$, M²O$_x$·(OH)$_y$), halogenides and/or alkoxides. This situation is reflected by choosing the term "comprising metal oxides". Purity of metal oxides may be determined by XPS. Suitable are nanocrystal shells with a purity >75 wt %, preferably >90 wt %, much preferably >95 wt %, as determined by X-ray photoelectron spectroscopy (XPS). It was found that such purities are sufficient to stabilize the core-shell nanocrystals and achieve the beneficial effects described herein.

Regarding shell morphology, it is preferred that the shell fully covers the nanocrystal core. It is further preferred that the shell is dense as discussed below in the context of assembly of nanocrystals.

Regarding shell morphology, it is further preferred that the shell is in direct contact to the nanocrystal core. In such embodiment, no ligands or ligand remnants are located between core and shell (as determined by TEM) or within the shell (as verified by XRD measurements). Such direct contact is achieved by the inventive manufacturing method described herein. The nanocrystals according to this embodiment have a simpler composition (one component less) and still retain the advantageous optical properties and stability. Absences of ligands or ligand remnants in the inventive core-shell nanocrystals can be inferred from TEM and XRD (X-Ray diffraction) spectra. Typically, ligands/ligand remnants between core and shell would be visible in TEM due to contrast difference. Typically, ligands/ligand remnants within the shell would prevent crystalline shell structures and thus not result in distinct peaks in the XRD spectrum.

Core-shell nanocrystals: The term core-shell nanocrystals is known in the field. Generally speaking, this term covers two general types of structures. First, one crystalline core is individually coated with a metal oxide coating, each of the crystalline cores thereby being surrounded by an individual metal oxide shell. Second, more than one crystalline core are collectively coated with an oxide coating, the nanocrystals thereby being embedded in an oxide matrix. The first structural type generally being preferred, and being obtainable according to the methods described herein.

Accordingly, in a preferred embodiment, the term core-shell nanocrystals when used in the context of this invention, relates to nanocrystals relates to the first mentioned structural type. In such embodiment, the term core-shell nanocrystal refers to an entity where one perovskite crystal is individually coated with a metal oxide coating, and the terms perovskite crystal and metal oxide shell are as defined herein.

Assembly of nanocrystals: As discussed above, the inventive method provides for the synthesis of a large number of nanocrystals with uniform properties ("assembly of nanocrystals"). This assembly of nanocrystals, obtained according to the inventive method, shows unique properties. Accordingly, the invention also provides for an assembly of nanocrystals obtainable by, or obtained by, a process as disclosed herein.

The invention also provides for an assembly of nanocrystals having a dense metal oxide shell covering the whole perovskite surface area. This property can be determined simply by a dissolution method. Conventional assemblies of perovskite crystals, e.g. the perovskites disclosed in Loiudice mentioned above, dissolve in polar solvent, such as alcohols (e.g. ethanol), ketones and glycolethers, and thereby loose its luminescent properties. To the contrary, the inventive assembly of nanocrystals is stable in polar solvents and retains its luminescent properties. This is proof for a dense and closed metal oxide shell covering the whole perovskite surface. Thus, the nanocrystal shell acts as a barrier for nanocrystal dissolution but does not deteriorate luminescent properties.

In embodiments, the invention also provides for an assembly of nanocrystals having a quantum yield (QY) of at least 50%, preferably at least 80% when dispersed in a solid matrix. According to this invention, QY is determined at 520-540 nm in the matrix/polar solvent where the inventive nanocroystals are dispersed.

In embodiments, the invention also provides for an assembly of nanocrystals having a quantum yield of at least 50% when dispersed in a polar solvent.

In embodiments, the invention also provides for an assembly of nanocrystals where the individual core-shell nanocrystals are free of cross-linking agent(s).

In embodiments, the invention also provides for an assembly of nanocrystals where the individual core-shell nanocrystals are free of linkers or ligand remnants, between said core and said shell and/or within said shell.

Step (a): Preparing the respective solution and dispersion as described below is entirely conventional.

Dispersion of perovskite crystals: The dispersion of step (a) contains, ie. comprises or consists of, a non-polar diluent, perovskite crystals and optionally surfactants. The crystals are finely dispersed in the diluent (continuous phase). Surfactants, if present, may be dissolved in the diluent and/or adsorbed on the crystals. These constituents shall be explained in further detail:

Non-polar solvent: Conventional organic diluents, typically characterized by a dielectric constant of less than 15, may be used. Advantageously, such non-polar solvent have a boiling point above 70° C. The term includes aromatics, aliphatics, halogenated aromatics, halogenated aliphatics, alkylethers and arylethers. Specific examples include toluene, mesitylene, dibenzylether, diphenylether and ODE. Preferred are phenyl derivatives such as toluene and mesitylene and alkyl derivatives, such as octadecene. As conventional in the field, a single non-polar solvent or a mixture of non-polar solvents may be used.

Perovskite crystals: This term is discussed above. Such crystals may be obtained according to known methods.

Surfactants: A broad range of surfactants may be included in the dispersion. Such surfactants improve stability of the dispersion and also facilitate formation of oxidic shell on perovskite core. Advantageously, zwitterionic ligands free of carboxylic acid moieties and free of amine moieties are used.

As conventional in the field, a single surfactant or a mixture of surfactants may be used. In embodiments, one single surfactant, preferably a zwitterionic surfactant, is used. In embodiments, a combination of two or more surfactants, preferably a zwitterionic surfactant and a non-zwitterionic surfactant, is used. In embodiments, a combination of two or more surfactants, preferably all selected from the group of zwitterionic surfactants, is used.

Solution comprising metal precursor: The solution of step (a) contains, ie. comprises or consists of, a first metal precursor and a second metal precursor. For the reaction to take place, the metal precursors are at least partly dissolved in said non-polar solvent. Typically, all of the metal precursor is dissolved in said non-polar solvent. Such composition is therefore termed "solution" in the context of this invention. These constituents shall be explained in further detail:

Non-polar solvent: The term is discussed above and likewise applicable. It is understood that the same or a different non-polar solvent may be used.

First metal precursor: Suitable are metal-alkoxides and metal carboxylates, all of them being commercial items. Suitable are, for example, alkoxides selected from the group comprising $O^tBu$, $OEt$, $OBn$, and $O^sBu$. Specific examples include alkoxides selected from the group comprising 2-Ethylhexanoate.

Second metal precursor: Suitable are metal-halides, all of them being commercial items. Specific examples include bromides, iodides and chlorides. Specific examples are $AlBr_3$, $AlI_3$, $AlCl_3$.

Step (b): According to this invention, no oxygen (gaseous) is supplied to the reaction. This is referred-to as "oxygen-free" conditions. The oxygen for forming the metal oxide shell is supplied to the system by way of the suitable precursor materials discussed above, i.e. the first metal precursor selected from metal-alkoxides and/or metal-alkoxylates.

In an embodiment, step (b) directly yields said shell in a thickness of 0.5-10 nm preferably 0.8-7 nm. Thus, contrary to the prior art, it is not a step repeated during the manufacturing. Rather, step (b) directly results in the desired metal oxide shell having the specified thickness within one single cycle.

In an embodiment, step (b) involves heating the reaction mixture to at least 80° C., preferably at least 100° C.

In an embodiment, step (b) involves applying microwave—assisted treatment.

Step (c): Conventional separation steps may be performed, suitable are, for example precipitation, centrifugation and combinations thereof.

In a second aspect, the invention relates to an assembly of core-shell nanocrystals. This aspect of the invention shall be explained in further detail below:

Compared to the prior art discussed above, it is possible to obtain nanocrystals which are particularly stable and retain their beneficial optical properties und harsh conditions. Until now, such assembly of nanocrystals was not available. Consequently, such assembly of nanocrystals is subject of the present invention.

In an embodiment, the invention provides for an assembly of core-shell nanocrystals, characterized in that said nanocrystal core comprises or consists of a perovskite crystal having a size of 3-100 nm as defined herein ($1^{st}$ aspect) and said nanocrystal shell comprises a metal oxide selected from $AlO_x$, with $1.4 \leq x \leq 1.6$ with a thickness of 0.5-10 nm, preferably 7-10 nm; or $SiO_x$, with $1.9 \leq x \leq 2.1$ with a thickness of 0.5-10 nm; or $TiO_x$, with $1.9 \leq x \leq 2.1$ with a thickness of 0.5-10 nm; or $ZrO_x$, with $1.9 \leq x \leq 2.1$ with a thickness of 0.5-10 nm.

In an embodiment, the chemical purity of said metal oxide is >75 wt %, preferably >90 wt %, much preferably >95 wt %, as discussed above, first aspect of the invention.

In an embodiment, the invention provides for an assembly of core-shell nanocrystals, characterized in that said nanocrystal core comprises or consists of a perovskite crystal having a size of 3-100 nm of formula (I')

$$A^1{}_a M^2{}_b X_c \qquad (I'),$$

wherein the substituents are defined as above (first aspect, organic perovskites), and said nanocrystal shell comprises a metal oxide having a thickness of 0.5-10 nm.

In embodiments, in the nanocrystals described in this second aspect, the metal oxide shell is (i) dense and (ii) covers the whole surface of the perovskite core. Such dense and full cover of the nanocrystal core distinguishes the inventive assembly of nanocrystals from the assembly of nanocrystals described in Loiudice, discussed above. Specifically, the inventive assembly of nanocrystals is highly luminescent nanocrystals and stable towards conditions or substances that might degrade the nanocrystals and cause a degradation in the luminescent properties. For example, the inventive assembly of nanocrystals is stable towards polar solvents and other liquids (e.g. $H_2O$) or gases ($O_2$, $H_2O$).

In a third aspect, the invention relates to a method for manufacturing a suspension of core-shell nanocrystals in a diluent. Manufacturing of suspensions comprising perovskite nanocrystals is known in the field. These methods are likewise applicable to the inventive method, using the respective starting materials. This aspect of the invention shall be explained in further detail below:

In embodiments, the invention relates to the manufacturing of core-shell nanocrystals in a diluent (a "suspension" or "ink") wherein said core-shell nanocrystals are as defined herein (first aspect of the invention) and wherein said diluent is a polar diluent, and wherein said method comprises the steps (a), (b) and (c) as described herein (first aspect of the invention) and further comprises step (d) dispersing said nanocrystals in said polar diluent. This step (d) results in formation of an ink comprising core-shell nanocrystals.

Polar diluent: The term is known in the field and includes polar solvents, preferably selected from the group of alcohols, glycolethers, ketones or carboxylic acids. The term polar diluent further includes polar curable components, preferably selected from the class of acrylates. Thus, a polar diluent comprises (i) one or more polar solvent(s), or (ii) one or more polar curable components, or (iii) combinations of both (i) and (ii).

Step (d): Dispersing nanocrystals in a diluent is known in the field. Suitable are, for example stir-mixing or ultrasonication.

In a fourth aspect, the invention relates to a suspension comprising core-shell nanocrystals in a diluent (an "ink") This aspect of the invention shall be explained in further detail below:

In embodiments, the inventive ink comprises core-shell nanocrystals are as defined herein, first aspect of the invention, and one or more polar solvents, preferably with a dielectric constant of more than 15. Advantageously, such polar solvents are selected from the group consisting of alcohols, glycolethers, ketones and carboxylic acids. Suitably, the concentration of said nanocrystals is in the range of 1-30 wt %, preferably 2-20 wt %.

In embodiments, the inventive ink comprises core-shell nanocrystals are as defined herein, first aspect of the invention, and one or more polar curable components, preferably selected from the class of acrylates. Suitably, the concentration of said nanocrystals is in the range of 1-30 wt %, preferably 2-20 wt %.

In embodiments, the inventive ink comprises core-shell nanocrystals are as defined herein, first aspect of the invention, and one or more polar curable components and one or more polar solvents, both as defined above. Suitably, the concentration of said nanocrystals is in the range of 1-30 wt %, preferably 2-20 wt %.

It comes as a surprise that the core-shell nanocrystals described herein retain their beneficial properties even in the presence of polar diluents. These inks are suited for film formation, as described below.

In a fifth aspect, the invention relates to a method for manufacturing a polymer film. Manufacturing of polymer films comprising perovskite nanocrystals is known in the field. These methods are likewise applicable to the inventive method, using the respective starting materials, e.g. the inks described herein (forth aspect). This aspect of the invention shall be explained in further detail below:

In embodiments, the invention provides for the manufacturing of a polymer film, said film comprises a polymer and an assembly of core-shell nanocrystals as defined herein (first aspect), and wherein said assembly of core-shell nanoparticles is homogeneously distributed in said polymer; and said method comprises the steps of: (x–1) combining an ink free of curable components as described herein (third aspect) with said polymer, or a pre-polymer of said polymer, and (y) forming a film.

In embodiments, the invention provides for the manufacturing of a polymer film, said film comprises a polymer and an assembly of core-shell nanocrystals as defined herein (first aspect), and wherein said assembly of core-shell nanoparticles is homogeneously distributed in said polymer; and said method comprises the steps of: (x–2) combining an assembly of nanocrystals as described herein ($2^{nd}$ aspect) with said polymer, or a pre-polymer of said polymer and optionally diluent, and (y) forming a film.

In embodiments, the invention provides for the manufacturing of a polymer film, said film comprises a polymer and an assembly of core-shell nanocrystals as defined herein (first aspect), and wherein said assembly of core-shell nanoparticles is homogeneously distributed in said polymer; and said method comprises the steps of: (x–3) providing an ink comprising curable components as described herein (third aspect) and (y) forming a film.

In embodiments, step (y) comprises coating the composition of step (x) on a substrate, and optionally curing or hardening and optionally solvent removal, to thereby obtain a polymer film on a substrate. This embodiment allows manufacturing of coatings on a substrate and manufacturing of laminates.

In embodiments, step (y) comprises extruding the composition of step (x), and optionally curing or hardening, and optionally solvent removal, to thereby obtain a polymer film. This embodiment allows manufacturing of free-standing films.

In a sixth aspect, the invention relates to a polymer film and light emitting devices. Polymer films and light emitting devices comprising the core-shell nanocrystals as described herein are not yet known.

In embodiments, the invention provides for a polymer film comprising core-shell nanocrystals homogeneously distributed in a polymer, wherein said core-shell nanocrystals are as defined herein, $2^{nd}$ aspect of the invention. The polymer layer may be used as an active layer in light emitting devices. The term polymer film shall include supported films, such as a coating on a substrate or a layer in a laminate and non-supported (free standing) films.

In embodiments, the invention provides for a light emitting device, comprising a polymer film of as described above, or an assembly of core-shell nanocrystals as described herein, $2^{nd}$ aspect of the invention. Light emitting devices are known in the field and include LCD displays, OLED displays, micro-LED displays. The core-shell nanocrystals are adapted to receive and absorb light of a first wavelength and emit light of a second (longer) wavelength. For example, blue light may be converted into green or red light by the inventive core-shell nanocrystals when implemented in a light emitting device.

To further illustrate the invention, the following examples are provided. These examples are provided with no intend to limit the scope of the invention.

1 Protocol for Synthesis of $AlO_x$ Shelled $CsPbBr_3$ NCs

1.1 $CsPbBr_3$ NCs

Cs-oleate 0.4 M in octadecene (ODE): $Cs_2CO_3$ (1.628 g, 5 mmol), Oleic acid (OA) (5 mL, 16 mmol) and ODE (25 mL) were heated to 120° C. under vacuum until no further gas evolution was observed.

Pb-oleate 0.5 M in ODE: $Pb(OAc)_2*3H_2O$ (4.58 g, 12 mmol), OA (8 mL, 25.3 mmol) and ODE (16 mL) were heated to 120° C. under vacuum until all water and acetic acid was removed.

TOP-Br2 0.5 M in mesitylene: Tricoctylphosphine (TOP) (6 mL, 13.5 mmol) and mesitylene (18 mL) were mixed and bromine (0.6 mL, 11.6 mmol) was carefully added under vigorous stirring.

Zwitterion capped $CsPbBr_3$ NCs: Pb-oleate (5 mL, 0.5M, 2.5 mmol), Cs-oleate (4 mL, 0.4M, 1.6 mmol), ASC18 ((N, -dimethyl-octadecylammonio) propane sulfonate) (201 mg, 0.48 mmol) and ODE (10 mL) were added to a 50 mL three-necked-flask and heated to 100° C. under vacuum. Once the gas evolution stopped, the flask was put under inert atmosphere and the temperature adjusted to 130° C. After reaching the reaction temperature, TOP-Br2 (5 mL, 0.5M, 2.5 mmol) was injected and the reaction was cooled to room temperature immediately using an ice-bath.

To the crude solution 3.5 eq. Ethyl acetate were added and the solution was centrifuged at 12 k rpm for 1 min. The supernatant was discarded and the precipitate dispersed in 12 mL toluene. The NCs were washed two more times by precipitation with 36 mL Ethyl acetate, centrifugation and dispersion in 12 mL toluene. After the last dispersion the solution was once more centrifuged at 12 k rpm for 2 min to remove aggregated particles.

The concentration of the final solution was determined from the absorption spectra using the absorption coefficient.

1.2 $AlO_x$ Shelled $CsPbBr_3$ NCs 0.12 mmol of the ASC18 capped $CsPbBr_3$ NCs of #1.1 were mixed with ODE (12 mL) and the toluene was evaporated under vacuum to obtain a NC dispersion.

A solution of $AlBr_3$ (48 mg, 0.18 mmol, 1.5 eq.) and $Al(O^sBu)_3$ (46 µL, 0.18 mmol, 1.5 eq) in 1 mL anhydrous mesitylene was prepared (toluene is likewise suitable as confirmed in parallel experiments) in the glovebox and then drop-wise added to the NC dispersion over 30 seconds under continuous stirring. The reaction was heated to 120° C. as fast as possible using a heating mantle and kept at 120° C. for 10 min. After the reaction period the flask cooled back to room temperature using a water bath. The NCs were precipitated from the crude solution with anhydrous acetone (25 mL). After precipitation the turbid solution was centrifuged at 12 k rpm for 1 min and the supernatant discarded.

The thus obtained $AlO_x$ shelled $CsPbBr_3$ NCs were washed by dispersion in n-butanol (1 mL) and precipitation with diethyl ether (20-50 mL depending on the colloidal stability) followed by centrifugation at 12 k rpm for 1 min. This washing step was generally only performed once but could be repeated as many times as needed. The obtained material is shown in FIG. 1.

1.3 Inks

The product was finally dispersed in 2-6 mL of an alcohol (ethanol, isopropanol or n-butanol are suitable alcohols) and centrifuged once more at 12 k rpm for 2 min to remove aggregated particles. This resulted in colloidal 25 suspensions of AlOx shelled $CsPbBr_3$ NCs in alcohol (ethanol, isopropanol and n-butanol). The zeta potential for these suspensions was between +20 and +40 meV.

1.3 Analysis

A) The $CsPbBr_3$ QD material of ex. 1.1 was analysed as follows.

The emission properties of the ink were measured with a spectrofluorometer equipped with an integrating sphere (Quantaurus Absolute PL quantum yield measuring system C13534, Hamamatsu) in a 10 mm quartz cuvette by diluting the ink in toluene. The photoluminescence quantum yield of above ink was 52% with an emission peak centered at 511 nm. The FWHM of the emission was determined as 19 nm. Absorption peak (spectrum measured with Jasco V670 spectrometer) was centered at 501 nm.

Figure 2:
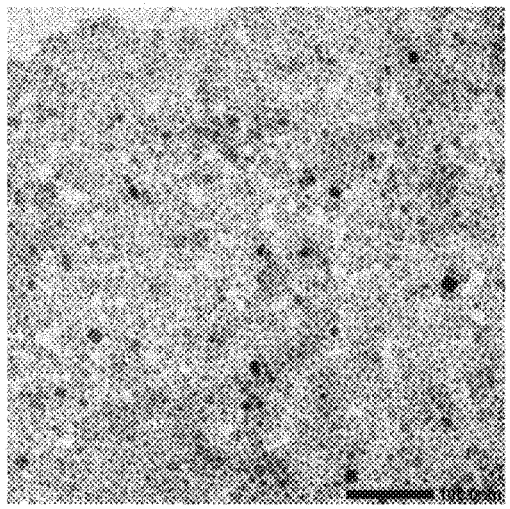
FIG. 2 shows TEM image of $CsPbBr_3$ NC material before the $AlO_x$ shell deposition according to ex.1.1.

TEM analysis of the $CsPbBr_3$ QD material, conducted with a JEOL JEM-1400 Plus microscope operated at 120 kV (FIG. 2), showed the presence of cubic shaped particles with a very narrow particle size distribution.

B) The $CsPbBr_3$ QD material of ex. 1.2 was analysed as follows. After the deposition of $AlO_x$ shell 2-propanol was used as diluent. The photoluminescence quantum yield of $CsPbBr_3/AlO_x$ ink was 69% with an emission peak centered at 513 nm. The FWHM of the emission was determined as 21 nm. Absorption peak was centered at 503 nm.

Figure 3:
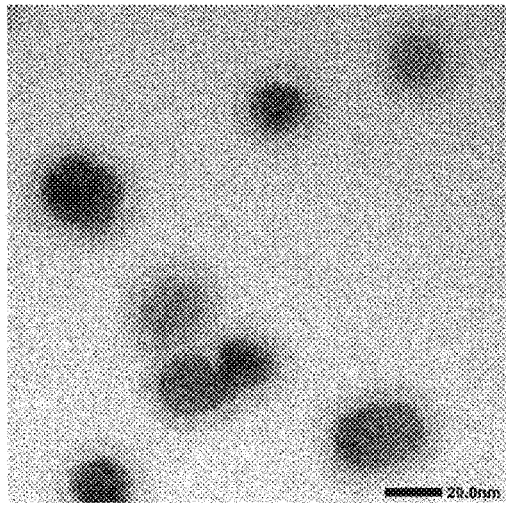
FIG. 3 shows TEM image of $CsPbBr_3$ QD material after the $AlO_x$ shell deposition according to ex. 1.2.

TEM analysis was again conducted with a JEOL JEM-1400 Plus microscope operated at 120 kV (FIG. 3). The particles had an oval shape and a deposited shell was clearly visible (FIG. 3)

XRD analysis, conducted with a STOE STADI P powder diffractometer, equipped with a germanium monochromator, Cu Kα irradiation (λ=1.540598 Å) and a silicon strip detector, showed the presence of crystalline $CsPbBr_3$ (orthorombic, space group Pnma, FIG. 1) and no detectable reflections from $AlO_x$-based material.

C) Comparison of analytical data for CsPbBr3 perovskites

| $CsPbBr_3$ | non-shelled NCs (comparative) | AlOx shelled NCs (inventive) |
| --- | --- | --- |
| QY | 52% | 69% |
| PeakPosition | 511 nm | 513 nm |
| FWHM | 19 nm | 21 nm |

1.5 Conclusion

A simple and reliable method for manufacturing $AlO_x$ shelled $CsPbBr_3$ NCs is provided. The thus obtained inks are stable over a prolonged period of time and are suitable for coating substrates using conventional coating techniques, such as R2R coating and ink-jet printing.

2 Synthetic Variations of the Protocol for Obtaining of $MO_x$ Shelled Perovskite NCs

2.1 Variations of the Above Protocol

The variations discussed below show the generality of the approach:

A: In the system $AlBr_3+Al(O^sBu)_3$, $AlBr_3$ was partly replaced by $AlI_3$. This results in partial insitu anion exchange. Further, $Al(O^sBu)_3$, $Al(OEt)_3$ and $Al(OBn)_3$, are likewise suitable starting materials.

B: Solvents tested for reaction 1.2 include toluene, mesitylene, dibenzylether, diphenylether and ODE. These solvents are likewise suitable.

C: For obtaining other oxidic shells, the system $AlBr_3+Al(OsBu)_3$ is replaced by $TiBr_4+Ti(OiPr)_4$ or $ZrBr_4+Zr(OiPr)_4$ or $SiCl_4+Si(OiPr)_4$. These starting materials in reaction 1.2 are likewise suitable to obtain the respective oxidic shells. The person skilled in the art can easily determine starting materials based on their availability and price.

D: Alternative perovskite nanocrystals are obtained by replacing the starting materials, e.g. Cs Oleate by Formamidinium oleate in reaction 1.1. These starting materials are likewise suitable to obtain the respective perovskite nanocrystals for the present reaction.

E: Solvents tested for inks in reaction 1.3 include alcohols between Ethanol and Hexanol, acetic acid, acrylic acid, THF and DCM. All these solvents allow stable formation of inks.

2.2 Conclusion

The protocol is suitable for a wide range of starting materials and solvents. Accordingly, a wide range of metal oxide shelled perovskite NCs are available.

These NCs are stable in a wide range of polar solvents and retain their beneficial optical properties.

3 Comparative Experiments

Inks comprising non-shelled NCs are compared with the inventive shelled NCs.

3.1 Comparative: $CsPbBr_3$ NCs

The non-shelled NCs from experiment 1.1 were precipitated with Ethyl acetate, centrifuged and dispersed in ethanol at 0.1 wt %.

No colloidal stability was observed, the NCs dissolve in ethanol. No emission and QY=0%.

3.2 Inventive $AlO_x$ Shelled $CsPbBr_3$ NCs

The shelled NCs from experiment 1.2 were precipitated with Ethyl acetate, centrifuged and dispersed in ethanol at 0.1 wt %.

A transparent and stable ink (no agglomeralon) was observed, colloidal stability is given.

Emission wavelength: 510-515 nm, and QY: 80% (unchanged when transferred from original solvent to ethanol).

3.3 Additional Tests

The shelled NCs from experiment 1.2 were precipitated with Ethyl acetate, centrifuged and dispersed in ethanol at 20 wt %.

Again, a transparent and stable ink (no agglomeralon) was observed, colloidal stability is given.

Emission wavelength (after dilution to 0.1 wt % for comparison with 3.2): 510-515 nm, and QY: 80%.

3.4 Conclusion

Perovskite NCs without an oxidic shell are not stable in polar solvents, and lose their beneficial optical properties. To the contrary, Perovskite NCs comprising an oxidic shell are stable in polar solvents, even at very high concentrations, and retain their beneficial optical properties.

The invention claimed is:

1. A method for manufacturing an assembly of core-shell nanocrystals, wherein said nanocrystal core comprises a perovskite crystal having a size of 3-100 nm, said perovskite crystal selected from compounds of formula (I):

wherein $A^1$ represents zero or one or more organic cations;

$M^1$ represents zero or one or more alkali metals;

$M^2$ represents one or more metals other than $M^1$;

X represents one or more anions selected from the group consisting of halides, pseudohalides, and sulfide;

a represents 1-4;

b represents 1-2;

c represents 3-9; and wherein either $M^1$ or $A^1$ or $M^1$ and $A^1$ being present; and wherein said nanocrystal shell comprises a metal oxide selected from the group consisting of $AlO_x$, with $1.4 \leq x \leq 1.6$; $SiO_x$, with $1.9 \leq x \leq 2.1$; $TiO_x$, with $1.9 \leq x \leq 2.1$; $ZrO_x$, with $1.9 \leq x \leq 2.1$; and combinations thereof and having a thickness of 0.5-10 nm; and wherein said method comprises the steps of:

(a) providing (i) a dispersion comprising perovskite crystals in a non-polar solvent and (ii) a solution comprising a metal halide and a metal alkoxide in a non-polar solvent, (b) combining said dispersion and said solution to obtain a reaction mixture, and includes either (i) heating the thus obtained reaction mixture to at least 80° C., or (ii) applying microwave—assisted treatment to the thus obtained reaction mixture, and (c) optionally separating the thus obtained nanocrystals from the solvent, to thereby obtain said assembly of nanocrystals.

2. The method according to claim 1, wherein said metal oxide is selected from the group consisting of $AlO_x$, with $1.4 \leq x \leq 1.6$; $SiO_x$, with $1.9 \leq x \leq 2.1$; $TiO_x$, with $1.9 \leq x \leq 2.1$; and $ZrO_x$, with $1.9 \leq x$ 2.1 and combinations thereof; and wherein said oxides show a chemical purity of >75 wt %.

3. The method according to claim 1, where said core-shell nanocrystals have a dense metal oxide shell covering the whole perovskite surface area; and/or show luminescence, and having a quantum yield of more than 50% (@ 520-540 nm, when dispersed in a solid matrix); and/or show luminescence and having a quantum yield of more than 50% (@ 520-540 nm, when dispersed in a polar solvent).

4. The method according to claim 1, where in step a) said dispersion contains:

one or more non-polar diluents;
perovskite nanocrystals;
one or more surfactants; and/or
said solution contains:
a non-polar solvent;
a metal-alkoxide;
one or more metal halides selected from $AlBr_3$, $AlI_3$, $AlCl_3$, and mixtures thereof.

5. The method according to claim 1, where said step b) directly yields said shell in a thickness of 0.5-10 nm; and/or
takes place under oxygen-free conditions.

6. The method according to claim 1, where said step c) takes place and comprises the step of precipitation and/or centrifugation.

7. An assembly of core-shell nanocrystals, obtained by a method as defined in claim 1 and
wherein said nanocrystal core comprises a perovskite crystal having a size of 3-100 nm; and
wherein said nanocrystal shell comprises a metal oxide selected from the group consisting of $AlO_x$, with $1.4 \leq x \leq 1.6$; $TiO_x$, with $1.9 \leq x \leq 2.1$; $ZrO_x$, with $1.9 \leq x \leq 2.1$; and combinations thereof and having a thickness of 0.5-10 nm; and
where the individual core-shell nanocrystals are free of cross-linking agent(s);
where the individual core-shell nanocrystals are free of linkers or ligand remnants between said core and said shell and/or within said shell; and
where the nanocrystal shell is dense and covers the whole surface of the nanocrystal core.

8. An assembly of core-shell nanocrystals, characterized in that:
said nanocrystal core comprises a perovskite crystal having a size of 3-100 nm and
said nanocrystal core comprises or consists of a perovskite crystal of formula (I")

$$A^1_a M^2_b X_c \tag{I''}$$

wherein
$A^1$ represents one or more organic cations, selected from the group consisting of formamidinium, ammonium, guanidinium, protonated thiourea, imidazolium, pyridinium, and pyrrolidinium;
$M^2$ represents one or more metals selected from the group consisting of Ge, Sn, Pb, Sb, and Bi;
X represents one or more anions selected from the group consisting of halides, pseudohalides, and sulfide;
a represents 1-4;
b represents 1-2;
c represents 3-9; and
said nanocrystal shell comprises a metal oxide having a thickness of 0.5-10 nm;
said nanocrystal shell comprises a metal oxide selected from the group consisting of $AlO_x$, with $1.4 \leq x \leq 1.6$; $TiO_x$, with $1.9 \leq x \leq 2.1$; and $ZrO_x$, with $1.9 \leq x \leq 2.1$; and
said nanocrystal shell is free of ligands, ligand remnants and cross-linking agents.

9. An assembly of core-shell nanocrystals according to claim 8, complying with one or more of the following characteristics:
each of said nanocrystals comprising one nanocrystal core and a nanocrystal shell; and/or
said nanocrystal shell is dense; and/or
said nanocrystal shell fully covers said nanocrystal core; and/or
said nanocrystal shell has a chemical purity >75%; and/or
said nanocrystal shell contains $AlO_x$, with $1.4 \leq x \leq 1.6$, and has a thickness of 0.8-7 nm.

10. A method for manufacturing a suspension of core-shell nanocrystals in a polar diluent, wherein
said core-shell nanocrystals are obtained by a method as defined in claim 1, and
said polar diluent comprises polar solvents and/or polar curable components, and
said method comprises the steps (a), (b) and (c) as defined in claim 1 and further comprises step (d) of dispersing said core-shell nanocrystals in said polar diluent; to thereby obtain said suspension.

11. A suspension comprising core-shell nanocrystals in a diluent, wherein said core-shell nanocrystals are as defined in claim 7; and said diluent is a polar diluent comprising polar solvents and/or polar curable components.

12. A method for manufacturing a polymer film, wherein said film comprises a polymer and an assembly of core-shell nanocrystals as defined in claim 7, and wherein said assembly of core-shell nanoparticles is homogeneously distributed in said polymer; and
said method comprises the steps of:
(x) combining the assembly of nanocrystals with said polymer, or a pre-polymer of said polymer, and
(y) forming a film.

13. The method of claim 12 wherein
said step (y) comprises coating the composition of step (x) on a substrate, and optionally curing or hardening and optionally solvent removal, to thereby obtain a polymer film on a substrate; or
said step (y) comprises extruding the composition of step (x), and optionally curing or hardening, and optionally solvent removal, to thereby obtain a polymer film.

14. A polymer film comprising core-shell nanocrystals homogeneously distributed in a polymer, wherein said core-shell nanocrystals are as defined in claim 7.

15. A light emitting device comprising a polymer film of claim 13.

16. A light emitting device comprising an assembly of nanocrystals as defined in claim 7.

17. A method for manufacturing a polymer film, wherein
said film comprises a polymer and an assembly of core-shell nanocrystals, and wherein said assembly of core-shell nanoparticles is homogeneously distributed in said polymer; and
said method comprises the steps of:
(x) providing a suspension according to claim 11 wherein said diluent comprises polar curable components but no polar solvent, and
(y) forming a film.

* * * * *